Aug. 13, 1935. A. E. BARNWELL 2,011,029
WINDSHIELD WIPER
Filed Nov. 22, 1932 2 Sheets-Sheet 1
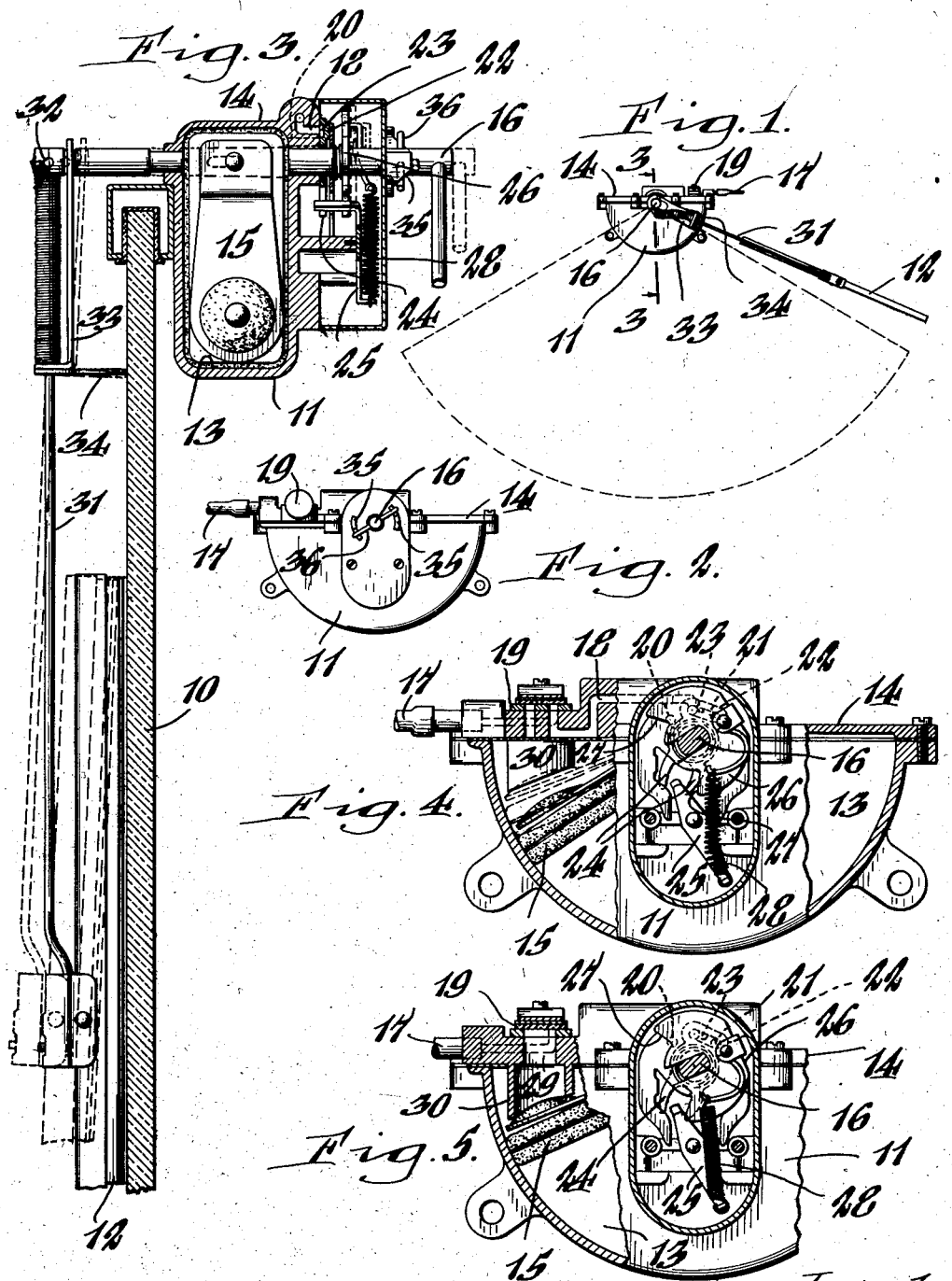
Inventor,
Albert E. Barnwell,
by Walter P. Geyer
Attorney.

Aug. 13, 1935.  A. E. BARNWELL  2,011,029
WINDSHIELD WIPER
Filed Nov. 22, 1932  2 Sheets—Sheet 2
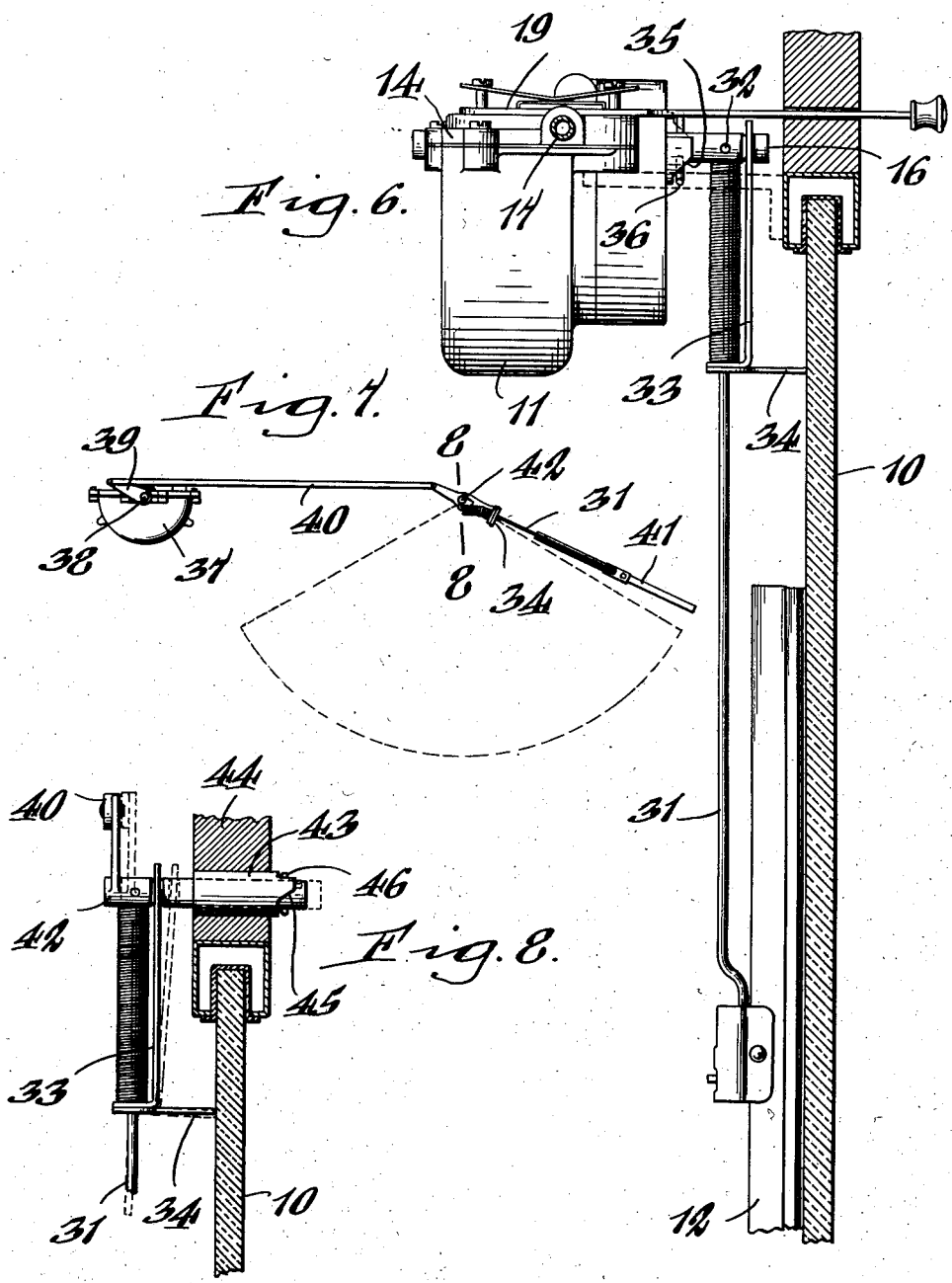
Inventor,
Albert E. Barnwell,
by Walter P. Guyer
Attorney.

Patented Aug. 13, 1935

2,011,029

UNITED STATES PATENT OFFICE 2,011,029

WINDSHIELD WIPER

Albert E. Barnwell, Buffalo, N. Y.

Application November 22, 1932, Serial No. 643,886

4 Claims. (Cl. 15—255)

This invention relates to improvements in windshield wipers of the type employed on automobiles.

One of its objects is the provision of a windshield wiper having means for holding the wiper-blade out of contact with the windshield when not in use and thereby prevent the wiper-blade, which is usually made of rubber, from bending over or curling at the edge and impairing the efficiency of the wiper.

Another object of the invention is to provide a windshield wiper having simple and reliable means for automatically shifting the wiper-blade laterally into and out of wiping contact with the windshield, such means being operable to bring the wiper into engagement with the windshield when the wiper mechanism is rendered operative and being released from wiping contact with the windshield when the wiping mechanism is rendered inoperative.

Other features of the invention reside in the construction and arrangement of parts hereinafter described and particularly pointed out in the appended claims.

In the accompanying drawings:—Figure 1 is a front elevation of a windshield wiper embodying my invention. Figure 2 is an enlarged rear elevation thereof. Figure 3 is an enlarged transverse vertical section taken substantially in the plane of line 3—3, Figure 1. Figure 4 is an enlarged front view, partly in section, of the wiper motor unit, showing the position of the parts in their normal operating position. Figure 5 is a similar view showing the position of the parts when the wiper-blade is in its inoperative position out of contact with the windshield. Figure 6 is an enlarged side elevation of the wiper showing the same position at the outside of the windshield. Figure 7 is a front view of a wiper mechanism showing a slightly modified form of the invention. Figure 8 is an enlarged, fragmentary, transverse section taken substantially on line 8—8, Figure 7.

Similar characters of reference indicate corresponding parts throughout the several views.

Referring now to Figures 1-5, inclusive, 10 indicates the windshield, 11 the casing of a fluid-pressure motor type of cleaner such as are now commonly used on motor vehicles, and 12 the wiper-blade which is operated by the fluid pressure motor to oscillate the same over the windshield. While the operating mechanism of the wiper which is housed within the casing 11 may be of any suitable and well known construction, that shown in the drawings, by way of example, consists of a piston chamber 13 formed in the casing 11 and closed at its top side by a cover 14. Operable within this chamber for transmitting motion to the wiper-blade, is a piston or vane 15 mounted on a rock shaft 16 suitably journaled in the casing 11, and as hereinafter described, so mounted as to be permitted a limited movement axially or in the direction of its length.

The oscillation of the piston may be accomplished in any approved manner, as by the suction derived from the intake manifold of the engine of the automobile, and for this purpose I have shown a conduit 17 connected at one end to the engine and at its other end to a suction port or passage 18 which is in valved communication with the piston chamber 13 and in which is interposed a suction control valve 19 for governing the flow of suction pressure to the chamber and controlling the starting and stopping of the wiper-blade 12. The suction passage is in indirect communicating relation at its inner end with the piston chamber 13 through ports 20 and 21 located in the wall of the casing 11 and at opposite sides of the axis of the operating shaft 16, whereby the influence of suction acts alternately on opposite sides of the piston to oscillate the wiper-blade over the windshield. For bringing the opposite sides of the piston under the influence of suction at the proper time, a disc-like valve 22 is loosely mounted on the shaft for oscillation relative thereto and is provided on its inner face with a bridging recess 23 for alternately connecting the suction passage 18 with the respective ports 20 and 21. This valve is provided at its lower end with spaced trip fingers 24 with which a trip lever 25 is adapted to alternately engage for rocking the valve to its respective positions to swing the wiper first in one direction and then the other. The trip lever is actuated at a predetermined time in the oscillating stroke of the wiper by a rocker element 26 which is applied to the shaft 16 to rock therewith and which has circumferentially-spaced shoulders 27 thereon for engagement with the trip lever to swing it in one direction or the other and accordingly control the shifting of the valve 22 to one position or the other. For the purpose of effecting a quick or snap action of this valve to its respective positions, a spring 28 is provided which comes into play adjacent to the ends of the operating strokes of the piston, one end of the spring being connected to the trip lever 25 while its other end is connected to the rocker element 26.

The valve-actuating rocker element 26 is so mounted on the shaft 16 that the valve 22 is alternately shifted to effect a normal operating travel of the wiper-blade 12 in an arcuate path over the windshield, provision being made, however, for an additional or tail-end movement of the wiper-blade in one direction when the control valve 19 is moved to its "off" position. When this valve is shut off, the suction from the engine thereupon acts through a valve-controlled port 29 opening into a suction cup 30 and extending into the chamber 13 to bring the piston 14 from the position shown by full lines in Figure 4, which depicts the end of the normal operating stroke of the wiper in one direction, to the position shown by dotted lines in said figure and by full lines in Figure 5. During this final or tail-end stroke of the piston, the rocker element 26 moves idly with the wiper shaft, the suction holding the wiper in its inoperative or at rest position.

The provision of the additional stroke imparted to the wiper in one direction over its normal operating stroke, after the control valve 19 is moved to its "off" position, is for the purpose of obtaining a sufficient and additional fractional turning of the operating shaft 16 which is utilized in effecting a lifting or lateral swinging movement of the wiper-blade 12 away from the windshield so that it is free from contact therewith when not in operation to prevent the bending or curling over of the blade edge and impairing the efficiency of the wiper. When the control valve 19 is moved to its "on" position, the additional stroke in the reverse direction is utilized to effect the return of the wiper-blade into operative engagement with the windshield. The preferred means for accomplishing these ends are constructed as follows:—

The operating shaft 16 is so mounted as to have a limited axial movement laterally of the casing 11 and the wiper-blade is suspended from a rod 31 pivotally connected at 32 to the shaft, a spring-tensioned member 33 tends to normally urge the wiper-blade into yielding engagement with the windshield. Intermediate its ends, the wiper-carrying rod 31 has a fulcrum bearing or foot 34 which is adapted to bear against the windshield, in the manner shown in Figure 3, and which constitutes a fulcrum point about which the rod may be swung laterally to bring the wiper-blade 12 into and out of engagement with the windshield. The lateral swinging of the wiper-carrying rod about its fulcrum 34 is effected by an axial movement imparted to the operating shaft 16 during the final and initial stroke of the wiper when the control valve 19 is turned off and on, respectively. The preferred means for imparting such axial movement to the shaft, to tilt the wiper into and out of engagement with the windshield consists of a cam surface 35 associated with the casing 11 and with which a radial pin 36 carried by the shaft is adapted to engage. As shown in Figure 2, this cam surface is composed of two diametrically opposite segmental sections which are spaced at opposite sides of the shaft-axis so that in the normal operation of the wiper, the shaft-pin 36 does not encounter the cam surface, but only encounters such cam surface during the heretofore referred to initial or tail-end stroke of the wiper, at which time the engagement of the pin with the cam surface causes the shaft to move in the case of the tail-end stroke of the wiper, in a direction to tilt the wiper-blade away from the windshield. The spring tensioned member 33 associated with the wiper-carrying rod has a tendency to urge the shaft 16 in a forward direction, that is, from the dotted line to the full line position shown in Figure 3. When the tail-end stroke is completed, after the control valve 19 is shut off, the wiper-blade is automatically moved away from the windshield through the engagement of the respective elements 35 and 36, and the parts are held in such position by the suction acting through the suction cup 30 on the piston 15, as seen in Figure 5. As soon as the control valve is moved to a position to render the wiper operative, the tensioned member 33 acts to move the shaft forwardly with the pin 36 riding down the cam surface 35, which action results in the blade-carrying arm 31 being tilted about its bearing fulcrum 34 to bring the wiper against the windshield.

In the embodiment of the invention shown in Figure 6, the actuating motor of the wiper is shown applied to the outside of the windshield instead of on the inside thereof, as shown in Figure 3.

Referring now to Figures 7 and 8, where the invention is shown in connection with a wiper which is link-connected to the motor unit, the numeral 37 indicates the motor unit, 38 the operating shaft thereof having a crank arm 39 thereon connected by a link 40 with a swinging wiper-blade 41 mounted on a rock-shaft 42 journaled in a sleeve-bearing 43 fitted in the windshield frame 44. For the purpose of obtaining a tilting of the wiper-blade into and out of engagement with the windshield when the motor unit is turned on and off, respectively, I provide the bearing sleeve 43 with a cam surface 45 and the rock-shaft 42 with a cross pin 46 arranged to engage such cam surface in a manner similar to that described in the previous construction.

I claim as my invention:—

1. In a windshield cleaner, a wiper-carrying element having a fulcrum bearing intermediate its ends for contact with a windshield to permit of a rocking movement thereof toward and from the windshield, a laterally-shiftable support movable in a plane at substantially right angles to the windshield and connected to said wiper-carrying element at one side of its fulcrum, means for actuating said element in a normal oscillatory stroke over the windshield, a control member for said actuating means, means operatively connecting said control member with the actuating means, means for imparting an additional movement to the wiper-carrying element at one end of its stroke when said control member is moved to its "on" and "off" positions, and means for shifting said support in said lateral direction during the additional movement imparted to the wiper-carrying element to rock the latter toward and from the windshield.

2. In a windshield cleaner, a bearing member, an oscillating wiper shaft journaled therein for limited axial displacement, a wiper arm having a cleaner element at its lower end for engagement with a windshield to be cleaned and having a pivotal connection at its upper end to said shaft and a laterally-extending fulcrum bearing intermediate its ends in contact with the windshield, the axis of said pivotal connection being at substantially right angles to the shaft-axis, means for imparting an additional movement to the wiper shaft at the beginning and ending of its starting and stopping strokes, and complementary means applied to said bearing member and said shaft for governing the lateral displacement of the shaft during the additional movement imparted thereto and controlling the swinging of the wiper arm about its fulcrum bearing to bring the cleaner element into and out of engagement with the windshield.

3. A cleaner for windshields, comprising a combined, oscillatory and axially movable shaft, a wiper arm pivotally connected at its upper end to said shaft to rock in a plane at substantially right angles to a windshield, said arm having a wiping blade at its lower end and a fulcrum bearing intermediate its ends arranged for contact with the windshield, means for oscillating said shaft to move the wiper arm and its blade over the windshield, and means for moving said shaft axially in one direction or the other for rocking the wiper arm about its fulcrum bearing to bring the wiping blade into and out of wiping engagement with the windshield.

4. A windshield cleaner, comprising an oscillatory wiper-carrying element tiltable laterally into and out of wiping engagement with a windshield to be cleaned, said wiper-carrying element including a fulcrum bearing intermediate its ends for contact with the windshield, means for actuating said element to normally travel over a predetermined path and to travel beyond such path at one end of its movement at the beginning and ending strokes of the wiper element, a control member movable to "on" and "off" positions for governing the respective strokes imparted to the wiper-carrying element by said actuating means, and automatic means operable during the beginning and ending strokes of said wiper-carrying element to tilt the same about its fulcrum bearing into and out of engagement with the windshield.

ALBERT E. BARNWELL.